United States Patent
Li et al.

(10) Patent No.: US 9,761,192 B2
(45) Date of Patent: Sep. 12, 2017

(54) METHOD AND DISPLAY APPARATUS FOR IMPROVING UNIFORMITY OF DISPLAYED IMAGE

(71) Applicant: Shenzhen China Star Optoelectronics Technology Co., Ltd., Shenzhen, Guangdong (CN)

(72) Inventors: Man Li, Guangdong (CN); Feilin Ji, Guangdong (CN); Xiaoping Tan, Guangdong (CN)

(73) Assignee: Shenzhen China Star Optoelectronics Technology Co., Ltd., Shenzhen, Guangdong (CN)

( * ) Notice: Subject to any disclaimer, the term of this patent is extended or adjusted under 35 U.S.C. 154(b) by 36 days.

(21) Appl. No.: 14/437,483

(22) PCT Filed: Jan. 5, 2015

(86) PCT No.: PCT/CN2015/070102
§ 371 (c)(1),
(2) Date: Apr. 21, 2015

(87) PCT Pub. No.: WO2016/101342
PCT Pub. Date: Jun. 30, 2016

(65) Prior Publication Data
US 2016/0343328 A1 Nov. 24, 2016

(30) Foreign Application Priority Data
Dec. 24, 2014 (CN) .......................... 2014 1 0816462

(51) Int. Cl.
*G06F 3/044* (2006.01)
*G09G 3/36* (2006.01)
(Continued)

(52) U.S. Cl.
CPC ......... *G09G 3/3659* (2013.01); *G02F 1/1362* (2013.01); *G06F 3/044* (2013.01);
(Continued)

(58) Field of Classification Search
CPC ......... G09G 3/3659; G09G 2320/0233; G09G 2320/02331; G09G 2320/0693;
(Continued)

(56) References Cited

U.S. PATENT DOCUMENTS 5,457,474 A 10/1995 Ikeda et al.
2003/0063047 A1* 4/2003 Starr .................... G09G 3/3655
345/32

(Continued)

FOREIGN PATENT DOCUMENTS

| CN | 102005185 A | 4/2011 |
| CN | 102930816 A | 2/2013 |

(Continued)

*Primary Examiner* — Lun-Yi Lao
*Assistant Examiner* — Jarurat Suteerawongsa
(74) *Attorney, Agent, or Firm* — Andrew C. Cheng (57) ABSTRACT

The present application provides a method and display apparatus for improving uniformity of displayed image, The method comprises inputting a first image signal to a display apparatus; compensating the first image signal in accordance with an image compensation data to obtain a third image signal, wherein the image compensation data is an amount of shift in a voltage of a common electrode of an array substrate of the display apparatus determined in accordance with a difference value between a grey level information of the first image signal and the grey level information of an original second image signal corresponding to the first image signal; and displaying the third image signal. Through the method above, the present invention effectively improves the uniformity of the displayed image without decreasing the displayed brightness of the image.

6 Claims, 4 Drawing Sheets

(51) Int. Cl.
*G02F 1/1362* (2006.01)
*G06F 3/041* (2006.01)
*G02F 1/1333* (2006.01)

(52) U.S. Cl.
CPC .......... *G06F 3/0412* (2013.01); *G06F 3/0416* (2013.01); *G09G 3/3688* (2013.01); *G02F 1/13338* (2013.01); *G02F 2001/136222* (2013.01); *G09G 2300/043* (2013.01); *G09G 2300/0408* (2013.01); *G09G 2300/0871* (2013.01); *G09G 2320/0223* (2013.01); *G09G 2320/0233* (2013.01); *G09G 2320/0693* (2013.01)

(58) Field of Classification Search
CPC ........ G09G 3/3688; G09G 2300/0408; G09G 2300/043; G09G 2300/0871; G02F 1/13338; G02F 1/1362; G02F 2001/136222; G06F 3/0412; G06F 3/0416; G06F 3/044
See application file for complete search history.

(56) References Cited

U.S. PATENT DOCUMENTS

| | | | |
|---|---|---|---|
| 2003/0222837 A1 | 12/2003 | Cho | |
| 2006/0250534 A1* | 11/2006 | Kutscher | G02F 1/13338 349/41 |
| 2007/0085790 A1 | 4/2007 | Chung et al. | |
| 2013/0038638 A1 | 2/2013 | Liao et al. | |
| 2014/0210841 A1* | 7/2014 | Song | G09G 3/34 345/589 |

FOREIGN PATENT DOCUMENTS

| | | |
|---|---|---|
| CN | 102930844 A | 2/2013 |
| JP | 2002366109 A | 12/2002 |

* cited by examiner

METHOD AND DISPLAY APPARATUS FOR IMPROVING UNIFORMITY OF DISPLAYED IMAGE

FIELD OF THE INVENTION

The present invention relates to a technique field of displaying, and more particularly to a method and a display apparatus for improving uniformity of displayed image.

BACKGROUND OF THE INVENTION

A touch screen, which is so called as touch control panel, is a sensing-type liquid crystal display apparatus which could accept input signals made by touch ends such as finger touching. When a graphic button on the screen is touched, a touch feedback system on the screen determines a location of the touch action in accordance with a preset scan method, and further determines the graphic button being touched so as to determine a type of an instruction. Compared with the conventional mechanical button panel, the touch screen is more convenient and therefore is applied widely.

A projected capacitive touch screen, which uses the touch control technique comprising self-capacitive touch technique and mutual-capacitive touch technique wherein a capacitance variation is generated when the finger is closing to the capacitive touch control panel, is one of the commonly used touch screens. It also comprises out-cell touch technique and embedded touch technique, wherein the embedded touch technique further comprises in-cell touch control technique and on-cell touch control technique. As the touch screen technique being developed, the in-cell touch control technique gradually becomes a main technique of the touch screen of middle or small size. By integrating a touch control electrode into the cell and processing an image signal and a touch screen signal separately by a same one control IC utilizing time division multiple access theory, a depth and a weight of a touch control display panel can be reduced for a certain degree.

Figure 1:
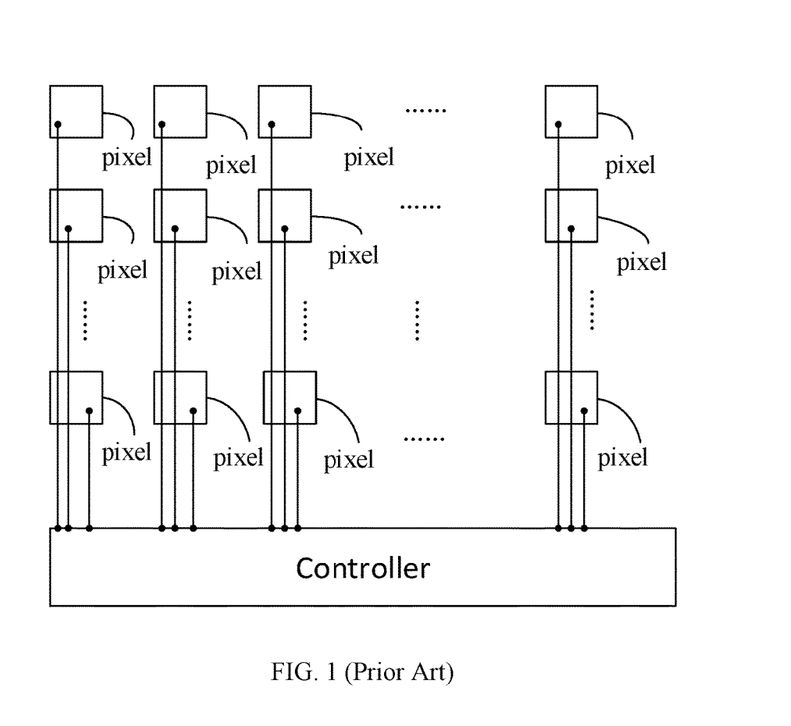
FIG. 1 is a schematic diagram of a common electrode array in a conventional array substrate.

Wherein, the in-cell touch control technique nowadays comprises a hybrid in-cell touch control technique. Since a part of the touch control electrodes are integrated into a common electrode of the array substrate in the hybrid in-cell touch control technique, the conducting lines coupled to the same electrode are relatively increased, and a space of the display screen and a space for expanding the signal lines are limited, the lengths of the conductors 103 for coupling the pixel electrodes and the common electrode of the array substrate are therefore different as shown in FIG. 1, i.e. the resistance of one with longer distance is different from the resistance of one with shorter distance, so that a voltage value at each common electrode terminal of the array substrate is different from others, the Vcom shift occurs, and finally the voltage values applying on the liquid crystal pixels are different and the problem of image non-uniformity occurs.

SUMMARY OF THE INVENTION

A primary technique problem to be solved by the present invention is to provide a method and a display apparatus for improving uniformity of a displayed image so as to effectively improve the uniformity of the display image while the brightness of the displayed image is not reduced.

In order to solve the technique problem mentioned above, one technique solution adopted by the present invention is to provide a method for improving uniformity of displayed image, which comprises:

inputting a first image signal to a display apparatus;

compensating the first image signal in accordance with an image compensation data to obtain a third image signal, wherein the image compensation data is an amount of shift in a voltage of a common electrode of an array substrate of the display apparatus determined in accordance with a difference value between a grey level information of the first image signal and the grey level information of an original second image signal corresponding to the first image signal; and displaying the third image signal.

Wherein, the display apparatus comprises a color-film substrate, the array substrate, and a liquid crystal layer disposed between the color-film substrate and the array substrate, a plurality of horizontally distributed touch control electrodes are disposed on one side of the color-film substrate backward the liquid crystal layer, a plurality of vertically distributed touch control electrodes are disposed on one side of the array substrate facing the liquid crystal layer, and the vertically distributed touch control electrodes and the common electrodes of the array substrate are integrated together to form a matrix formation on the array substrate.

Wherein, the step of compensating the first image signal in accordance with the image compensation data to obtain the third image signal comprising:

compensating the voltage of an input signal of a pixel electrode corresponding to the common electrode in accordance with the amount of shift in the voltage of the corresponded common electrode of the array substrate, so as to equalize a plurality of voltage differences between the compensated voltages of the input signals of the pixel electrodes and the voltages of the corresponded common electrodes.

In order to solve the technique problem mentioned above, another technique solution adopted by the present invention is to provide a method for improving uniformity of displayed image, comprising:

obtaining a first image signal of an image displayed on a screen of a display apparatus by the display apparatus;

comparing the first image signal with an original second image signal corresponding to the first image signal to determine a compensation data of the first image signal; and storing the compensation data.

Wherein, the step of comparing the first image signal with the original second image signal corresponding to the first image signal to determine the compensation data of the first image signal comprises:

calculating a difference value between a grey level information of the first image signal and the grey level information of the second image signal, which is output from a signal source and corresponds to the first image, determining an amount of shift in a voltage of a common electrode corresponding to the difference value, and determining the compensation data of the first image signal in accordance with the amount of shift by the display apparatus.

Wherein, the step of obtaining the first image signal of the image displayed on the screen comprises:

obtaining the first image signal displayed on the screen of the display apparatus from a detect device by the display apparatus, wherein the first image signal is obtained through photographing the image displayed on the screen by the detect device.

In order to solve the technique problem mentioned above, the other technique solution adopted by the present invention is to provide a display apparatus for improving uniformity of displayed image, which comprises a driving circuit, a compensation circuit and a display panel electrically coupled to each other, wherein the driving circuit inputs a first image signal;

the compensation circuit compensates the first image signal in accordance with an image compensation data to obtain a third image signal; wherein the image compensation data is an amount of shift in a voltage of a common electrode of an array substrate of the display apparatus determined in accordance with a difference value between a grey level information of the first image signal and the grey level information of an original second image signal corresponding to the first image signal; and the display panel displays the third image signal.

Wherein, the display panel comprises a color-film substrate, the array substrate, and a liquid crystal layer disposed between the color-film substrate and the array substrate, a plurality of horizontally distributed touch control electrodes are disposed on one side of the color-film substrate backward the liquid crystal layer, a plurality of vertically distributed touch control electrodes are disposed on one side of the array substrate facing the liquid crystal layer, and the vertically distributed touch control electrodes and the common electrodes of the array substrate are integrated together to form a matrix formation on the array substrate.

Wherein, the compensation circuit compensates the voltage of an input signal of a pixel electrode corresponding to the common electrode in accordance with the amount of shift in the voltage of the corresponded common electrode of the array substrate, so as to equalize a plurality of voltage differences between the compensated voltages of the input signals of the pixel electrodes and the voltages of the corresponded common electrodes.

The efficacy of the present invention is, different from the conventional technique, after a first image signal is input, the display apparatus compensates the first image signal in accordance with a compensation data to obtain a third image signal, wherein the compensation data is an amount of shift in a voltage of a common electrode of an array substrate of the display apparatus determined in accordance with a difference value between a grey level information of the first image signal and the grey level information of an original second image signal corresponding to the first image signal, so as to equalize a plurality of voltage differences between the compensated voltage of the input signal of each pixel electrode and the voltage of the corresponded common electrode, and to improve uniformity of the displayed image and watching experience of the users without decreasing the brightness of the displayed image.

DETAILED DESCRIPTION OF PREFERRED EMBODIMENTS

Figure 2:
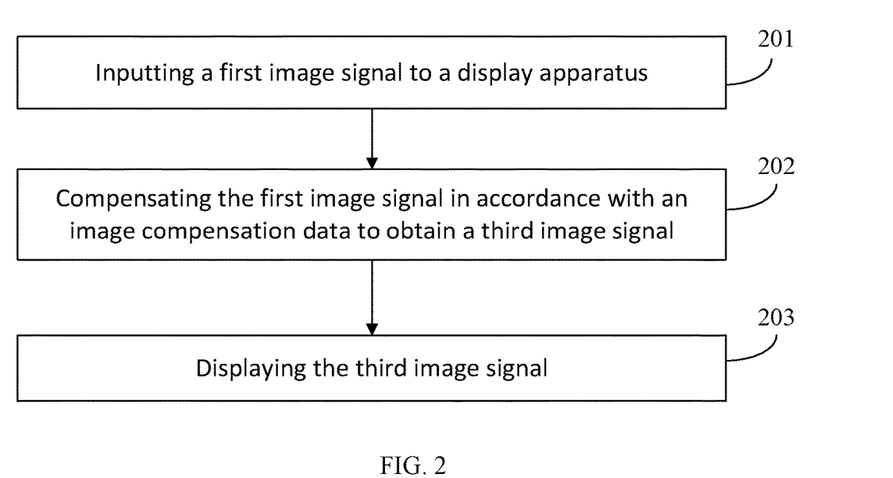
FIG. 2 is a flow chart according to one embodiment of the method for improving uniformity of displayed image of the present invention.

Please refer to FIG. 2. FIG. 2 is a flow chart according to one embodiment of the method for improving uniformity of displayed image of the present invention. The method for improving uniformity of displayed image of the embodiment comprises the steps as follows:

201: Inputting a first image signal to a display apparatus.

The display apparatus has to be conducted to a signal source before displaying an image so that the first image signal to be displayed can be input.

Figure 3:
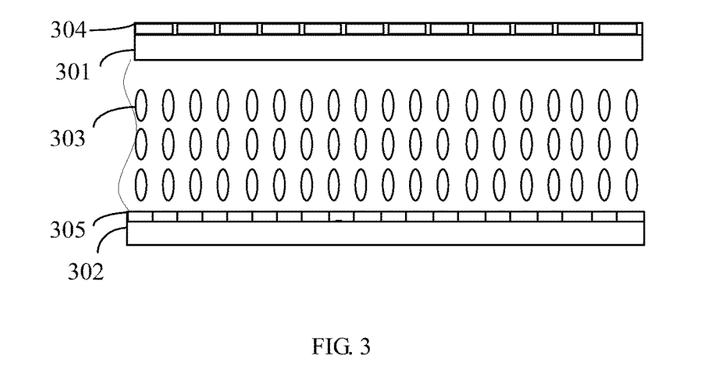
FIG. 3 is a schematic diagram according to one embodiment of the display apparatus in FIG. 2.

Specifically, as shown in FIG. 3, which is a schematic diagram according to one embodiment of the display apparatus in FIG. 2, the display apparatus of the embodiment comprises a color-film substrate 301, an array substrate 302 disposed opposite to the color-film substrate 301, and a liquid crystal layer 303 disposed between the color-film substrate 301 and the array substrate 302, wherein a plurality of horizontally distributed touch control electrode 304 are disposed on an outer side of the color-film substrate 301, i.e. the side backward the liquid crystal layer 303, a plurality of touch control electrode 305 in the vertical direction and the common electrode of the array substrate 302 (Array Vcom) are integrated together on an inner side of the array substrate 302, i.e. the side facing the liquid crystal layer 303, to form a matrix formation on the array substrate 302.

The display apparatus realizes the control over a touch control signal and a display by using a time division multiple access method, that is, each frame is divided into two time duration for emitting and processing the display signal and the touch control signal, respectively. When the display apparatus is in a display stage, the terminals of all common electrodes of the array substrate 302 are coupled together and the liquid crystal molecules 303 are controlled to twist so that voltage differences are generated on the electrode electrodes. If the voltage difference applied on each pixel electrode is identical, the image displayed on the screen of the display apparatus would be uniform.

202: Compensating the first image signal in accordance with an image compensation data to obtain a third image signal, wherein the image compensation data is an amount of shift in a voltage of a common electrode of an array substrate of the display apparatus determined in accordance with a difference value between a grey level information of the first image signal and the grey level information of an original second image signal corresponding to the first image signal.

Wherein, the image compensation data is stored in the display apparatus.

Because there is inaccuracy in the structure of the display apparatus, the lengths of the conductors for coupling the common electrode of the array substrate 302 and the pixel electrodes are unequal, i.e. the resistances of the conductors with longer distance and the conductors with shorter length are different, the voltages across the conductors with different resistances are different, and the voltage applied on each common electrode of the array substrate is not identical, i.e. Vcom shift occurs, and the voltage values on the common electrodes of the array substrate 302 are different when the image signal is displayed. In order to uniformly display the input first image signal on the display apparatus, the voltage difference between the voltage applied on two terminals of each pixel electrode and the voltage applied on the common electrode of the array substrate 302 should be kept at a constant value. The display apparatus compensates the first image signal to obtain the third image signal after the first image signal is input.

Wherein, the image compensation data is an amount of shift in a voltage of one of the common electrodes of the array substrate of the display apparatus determined in accordance with a difference value between a grey level information of the first image signal and the grey level information of an original second image signal corresponding to the first image signal.

Specifically, the image compensation data comprises compensation data of each region of the image corresponding to the first image signal. The display apparatus compensates each region which is non-uniform displayed, respectively, so as to obtain the compensated third image signal which can be uniformly displayed.

Specifically, the display apparatus compensates the voltages of the input signal of each pixel electrode corresponding to the common electrode in accordance with the amount of shift in the voltage of the corresponded common electrode, so that the voltage differences between the voltages of the input signals of the pixel electrodes and the voltage of the corresponded common electrode are the same.

As described above, the grey level of the image is determined by the voltage difference applied on the pixel electrode. When the voltage of the common electrode is shifted, the method of this embodiment compensates the voltage of the input signal of the pixel electrode to ensure that the voltage differences applied on all pixel electrodes are the same. Specifically, the display apparatus compensates the voltages of the input signal of each pixel electrode corresponding to the common electrode in accordance with the amount of shift in the voltage of the corresponded common electrode, that is, the voltage of the input signal of the pixel electrode is compensated for a value the same as the amount of shift in the voltage of the corresponded common electrode, so that the voltage differences between the voltages of the input signals of the pixel electrodes and the voltage of the corresponded common electrode are the same.

Figure 4:
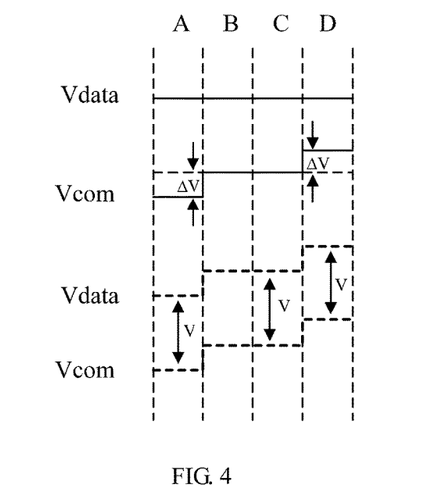
FIG. 4 is a schematic diagram illustrating the voltages before and after compensation in a display stage of a first image signal of the present invention.
Figure 5:
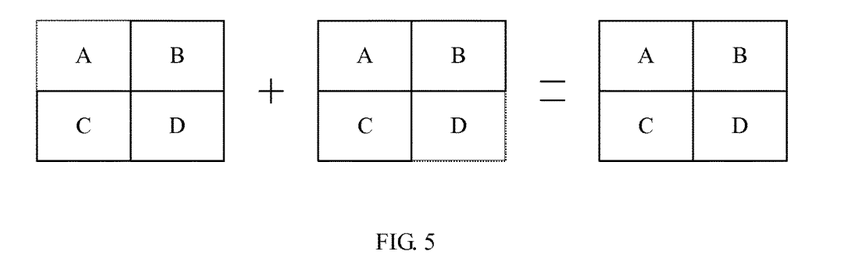
FIG. 5 is a schematic diagram illustrating the brightness before and after compensation in a display stage of a first image signal of the present invention.

As shown in FIG. 4, the solid line Vdata represents the voltage of the input signal of the pixel electrode before compensation and is a constant value, and the solid line Vcom represents the voltage of the common electrode before compensation. It can be found from FIG. 4, the voltages of the common electrodes comprise an amount of shift $\Delta V$ having the same modulus and opposite in sign in regions A and D, respectively. Accordingly, the voltage of the input signal of the pixel electrode in the region A should be compensated by $-\Delta V$ and the voltage of the input signal of the pixel electrode in the region D should be compensated by $\Delta V$, as illustrated by the dashed line Vdata, The dashed line Vdata represents the compensated voltage of the input signal of the pixel electrode, and the dashed line Vcom represents the voltage of the common electrode after compensation. After compensation, the voltage difference V between the voltages of the input signals of the pixel electrodes and the voltages of the common electrodes are the same in the four regions A, B, C and D. Finally, after compensation, the grey levels of the pixels in the displayed image corresponding to the third image signal are corresponded, and the brightness of the image is uniformed. As shown in FIG. 5, FIG. 5 is a schematic diagram illustrating the brightness before and after compensation in a display stage of a first image signal.

203: Displaying the third image signal.

After compensating the input first image signal, the third image signal after compensation and corresponding to the first image signal is displayed.

Different from the conventional technique, the display apparatus in the method of this embodiment compensates the first image signal in accordance with the image compensation data to obtain the third image signal after the first image signal is input, wherein the image compensation data is an amount of shift in a voltage of one of the common electrodes of the array substrate of the display apparatus determined in accordance with a difference value between a grey level information of the first image signal and the grey level information of an original second image signal corresponding to the first image signal, so as to equalize a plurality of voltage differences between the compensated voltage of the input signal of each pixel electrode and the voltage of the corresponded common electrode, and to improve uniformity of the displayed image and watching experience of the users without decreasing the brightness of the displayed image.

Figure 6:
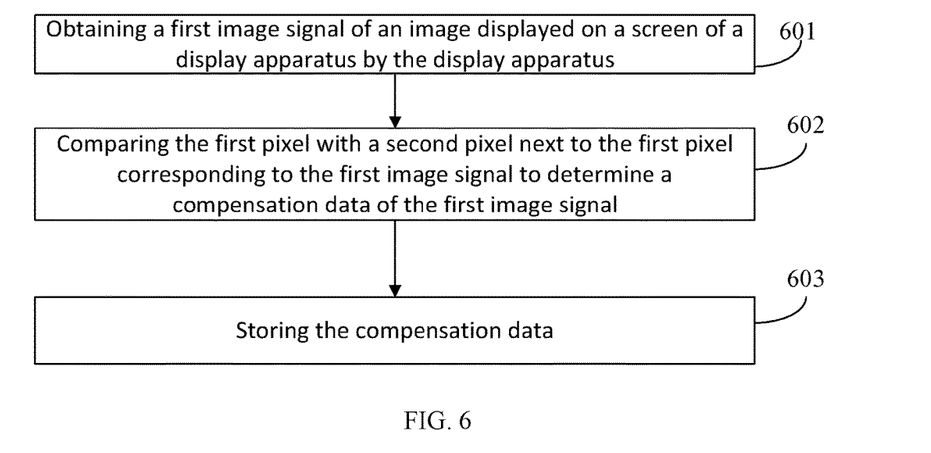
FIG. 6 is a flow chart according to another embodiment of the method for improving uniformity of displayed image of the present invention.

Refer to FIG. 6, which is a flow chart according to another embodiment of the method for improving uniformity of displayed image of the present invention. The method for improving uniformity of displayed image of this embodiment comprises the steps as follows:

601: Obtaining a first image signal of an image displayed on a screen of a display apparatus by the display apparatus.

When a user watches an image displayed by a screen of a display apparatus with touch control display function, a better quality image can be watched if the brightness of the displayed image is uniform, but the normal watching would be affected if the brightness of the displayed image is non-uniform.

In order to determine whether the image displayed by the display apparatus is uniform, the image displayed by the display apparatus should be obtained as an object for determination and reference. In the present embodiment, the first image signal is obtained by a detect device through photographing the image signal displayed by the screen.

In another embodiment, in order to reduce the amount of operation, the detect device obtains the first image signal which is determined to be non-uniform displayed after the user makes a rough determination on the displayed image, so that the consumed resource of the detect device and the amount of operation can be reduced.

The display apparatus obtains the first image signal through the detect device.

The uniformity of the brightness displayed by the screen is determined by whether the displayed grey levels of the image are consistent or not, and the displayed grey level is determined by a voltage difference between an input voltage of a pixel electrode and a voltage of a common electrode. When the voltage difference between an input voltage of each pixel electrode and the voltage of the common electrode is identical, the twisted angle of the liquid crystal molecule and the transmittance of light is identical, so that the brightness displayed on the screen is identical, i.e. the brightness of the displayed image is uniform.

Figure 7:
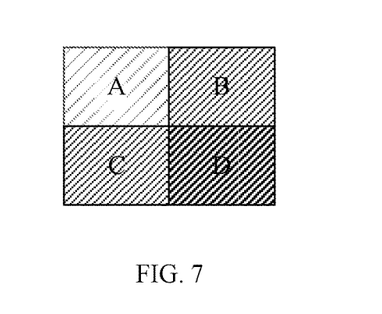
FIG. 7 is a schematic diagram illustrating an equivalent effect of a grey level according to one embodiment of a first image signal of the method for improving uniformity of displayed image of FIG. 6.

Furthermore, a factor affecting the uniformity of the brightness of the displayed image is the displayed grey level of the image. Therefore, the detect device obtains a grey level information of the first image signal after obtaining the first image signal, wherein the information of every part of the same image has to be obtained. As shown in FIG. 7, which is a schematic diagram illustrating an equivalent effect of a grey level of the first image signal according to one embodiment of the method of FIG. 6, the grey level information of four regions A, B, C and D is obtained, respectively.

Wherein, the detect device comprises but not limits to a high frequency camera, and any device which is capable of obtaining the first image signal can be adopted as the detect device of the present embodiment.

After obtaining the first image signal, the detect device transmits the first image signal to the display apparatus with touch control display function, and therefore the display apparatus obtains the first image signal displayed by the screen from the detect device accordingly. Specifically, the display apparatus obtains the grey level information of each region of the first image signal while obtaining the first image signal.

602: Comparing the first image signal with an original second image signal corresponding to the first image signal to determine a compensation data of the first image signal.

After obtaining the first image signal, the display apparatus sends the first image signal to a driving controller of the display apparatus for processing so that the first image signal is compared to an original and normal second image signal corresponding to the first image signal to determine whether the first image signal is a normal signal.

Specifically, the display apparatus calculates a difference value between the grey level information of the first image signal and the grey level information of the second image signal by the driving controller, which comprises comparing the grey level information of each region of the first image signal with the grey level information of a corresponded region of the second image signal, and determining whether the grey level information of the first image signal is consistent with the grey level information of the second image signal, i.e. determining whether the difference value of each region is zero, so as to prevent from the resource consuming caused by misjudgment from viewing angles.

As analyzed in the step 601, a shift of grey level information is caused by different twisted angle of the liquid crystal molecules resulted from the different voltage differences between the input voltages of the pixel electrodes and the voltages of the common electrode, and a direct cause of the different voltage differences between the input voltages of the pixel electrodes and the voltages of the common electrode is that a voltage shift existed in the voltage of the common electrode. The more the amount of shift is, the more a variation of the voltage difference between the input voltage of the pixel electrode and the voltage of the common electrode is, and the problem of non-uniformity is more serious. Therefore, when the grey level information of the first image signal is not consistent with the grey level information of the second image signal, the amount of shift in the voltage of the common electrode corresponding the first image signal is further determined, and the compensation data is determined in accordance with the amount of shift.

Figure 8:
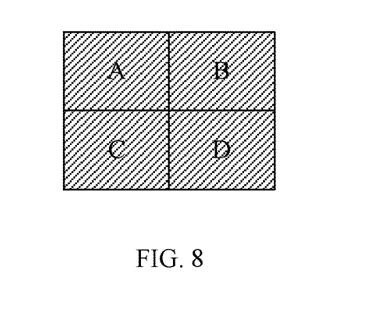
FIG. 8 is a schematic diagram illustrating an equivalent effect of a grey level according to one embodiment of a second image signal of the method for improving uniformity of displayed image of FIG. 6.

For example, as shown in FIG. 8, which is a schematic diagram illustrating an equivalent effect of a grey level according to one embodiment of a second image signal of the method for improving uniformity of displayed image of FIG. 6, and also referred to FIG. 7, the brightness of the region A in FIG. 7 is obviously greater than the brightness of the region A in FIG. 8, i.e. the grey level information of the region A of the first image signal is greater than the grey level information of the region A of the second image signal, but the brightness of the region D in FIG. 7 is obviously smaller than the brightness of the region D in FIG. 8, i.e. the grey level information of the region D of the first image signal is smaller than the grey level information of the region D of the second image signal. That is, the grey level information of the first image signal is inconsistent with the grey level information of the second image signal, and therefore the amount of shift in the voltage of the common electrode corresponding to the first image signal is determined and the compensation data of the first image signal is determined in accordance with the amount of shift.

603: Storing the compensation data.

Because, in general, each tiny electrode and other devices in the display apparatus would not vary after the display apparatus is manufactured, the compensation data is stored in the display apparatus for compensating the displayed first image signal in order to overcome the non-uniformity of the displayed image resulted from the amount of shift in the voltage of the common electrode of the array substrate due to the structure of the display apparatus during operating the display apparatus, so that the voltage difference between the voltage of the input signal of the pixel electrode and the voltage of the common electrode is identical while displaying any kind of first image signal to ensure the uniformity of the image displayed on the screen of the display apparatus.

Different from the conventional technique, the display apparatus in the present embodiment obtains the first image signal of the image displayed on the screen of the display apparatus, compares the first image signal with the second image signal output from a signal source and corresponded to the first image signal, determines the compensation data of the first image signal and stores the compensation data, so that the image signal can be displayed by the display apparatus in accordance with the compensation data, and the voltage difference between the voltage of the input signal of each pixel electrode and the voltage of the common electrode is identical, so as to improve uniformity of the displayed image and watching experience of the users without decreasing the brightness of the displayed image.

Figure 9:
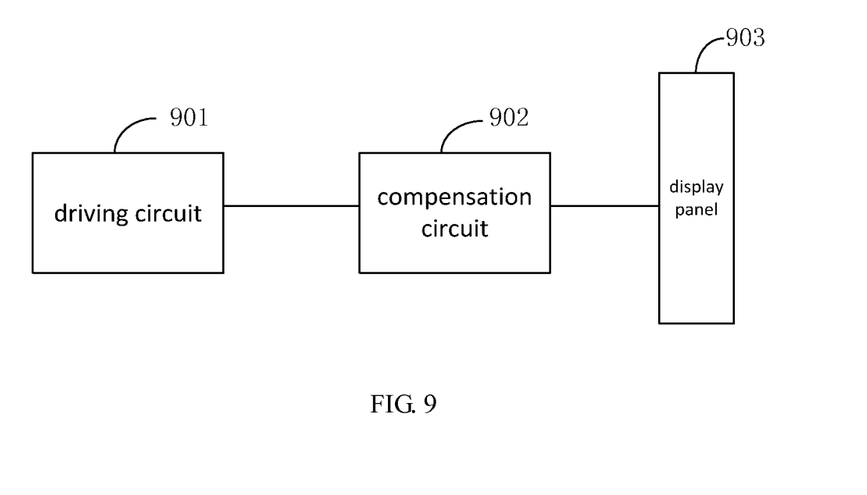
FIG. 9 is a schematic diagram according to one embodiment of a display apparatus for improving uniformity of displayed image of the present invention.

Please refer to FIG. 9, which is a schematic diagram according to one embodiment of a display apparatus for improving uniformity of displayed image of the present invention.

The display apparatus in the present embodiment comprises a driving circuit 901, a compensation circuit 902 and a display panel 903 electrically coupled to each other.

The display panel 903 specifically comprises a color-film substrate (CF), an array substrate (Array) disposed opposite to the color-film substrate, and a liquid crystal layer (LC), wherein a plurality of horizontally distributed touch control electrode (RX) are disposed on an outer side of the color-film substrate, i.e. the side backward the liquid crystal layer, a plurality of touch control electrode (TX) in the vertical direction and the common electrode of the array substrate (Array Vcom) are integrated together on an inner side of the array substrate, i.e. the side facing the liquid crystal layer, to form a matrix formation on the array substrate.

The display apparatus in the present embodiment have two functions of touch control and display, wherein the operation method is to realize the control over a touch control signal and a display by using a time division multiple access method, that is, each frame is divided into two time duration for emitting and processing the display signal and the touch control signal, respectively. When the display apparatus is in a display stage, the terminals of all common electrodes of the array substrate are coupled together and the liquid crystal molecules are controlled to twist so that voltage difference occurs on the electrode electrodes. If the voltage difference applied on each pixel electrode is identical, the image displayed on the screen of the display apparatus would be uniform.

The driving circuit 901 inputs a first image signal.

The display apparatus has to be coupled to a signal source so that the first image signal to be displayed can be input before displaying the image, and, correspondingly, the driving circuit 901 is for inputting the first image signal.

The compensation circuit 902 compensates the first image signal in accordance with an image compensation data to obtain a third image signal. Wherein, the image compensation data is an amount of shift in a voltage of a common electrode of an array substrate of the display apparatus determined in accordance with a difference value between a grey level information of the first image signal and the grey level information of an original second image signal corresponding to the first image signal.

Because there is inaccuracy in the structure of the display apparatus, the lengths of the conductors for coupling the common electrode of the array substrate and the pixel electrodes are unequal, i.e. the resistances of the conductors with longer distance and the conductors with shorter length are different so that the voltage applied on each common electrode of the array substrate is not identical, i.e. Vcom shift occurs, and the voltage values on each common electrode of the array substrate is not identical when the image signal is displayed. In order to uniformly display the input first image signal on the display apparatus, i.e. to ensure the voltage difference between the voltage applied on two terminals of each pixel electrode and the voltage applied on the common electrode of the array substrate to be kept at a constant value, the display apparatus compensates the first image signal to obtain the third image signal after the first image signal is input.

Wherein, the image compensation data is the amount of shift in the voltage of the common electrode of the array substrate of the display apparatus determined in accordance with the difference value between the grey level information of the first image signal and the grey level information of the original second image signal corresponding to the first image signal.

Specifically, the image compensation data comprises compensation data of each region of the image corresponding to the first image signal. The display apparatus compensates each region which is non-uniform displayed, respectively, so as to obtain the compensated third image signal which can be uniformly displayed.

Specifically, the display apparatus compensates the voltages of the input signal of each pixel electrode corresponding to the common electrode in accordance with the amount of shift in the voltage of the corresponded common electrode, so that the voltage differences between the voltages of the input signals of the pixel electrodes and the voltage of the corresponded common electrode are the same.

The display panel 903 displays the third image signal.

Different from the conventional technique, after the driving circuit of the display apparatus in the present embodiment inputs the first image signal, the compensation circuit compensates the first image signal in accordance with the image compensation data to obtain the third image signal, and the display panel displays the third image signal. Wherein, the image compensation data is the amount of shift in the voltage of the common electrode of the array substrate of the display apparatus determined in accordance with the difference value between the grey level information of the first image signal and the grey level information of the original second image signal corresponding to the first image signal. Accordingly, the voltage difference between the voltage of the input signal of each pixel electrode of the display panel and the voltage of the common electrode is identical, and the uniformity of the displayed image and watching experience of the users is improved without decreasing the brightness of the displayed image.

Figure 10:
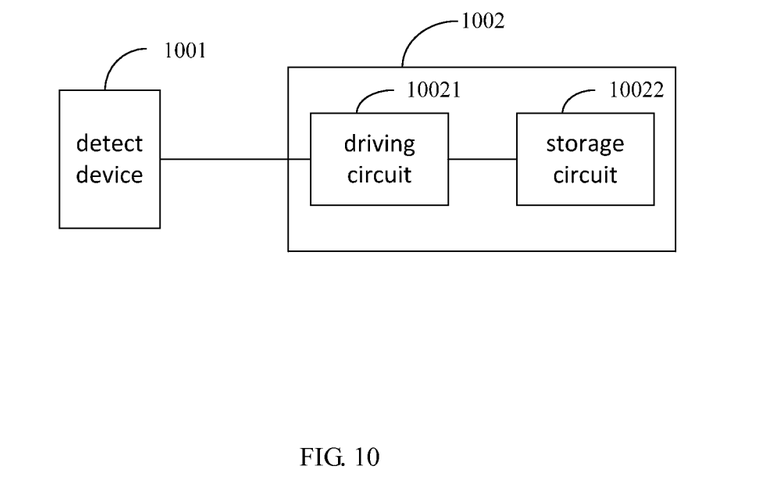
FIG. 10 is a schematic diagram according to one embodiment of a system for improving uniformity of displayed image of the present invention.

Please refer to FIG. 10, which is a schematic diagram according to one embodiment of a system for improving uniformity of displayed image of the present invention.

The system in the present embodiment comprises a detect device 1001 and a display apparatus 1002, the display apparatus 1002 comprises a driving circuit 10021 and a storage circuit 10022 electrically coupled to each other, and the detect device 1001 is coupled to the driving circuit 10021 of the display apparatus 1002, wherein the detect device 1001 and the driving circuit 10021 can be coupled through a wire connection or a wireless connection, which is not limited here.

Wherein, the detect device comprises but not limits to a high frequency camera, and any device which is capable of obtaining the first image signal can be adopted as the detect device of the present embodiment.

The display apparatus comprises and is not limited to a large size display apparatus such as a large-scale liquid crystal touch control television, a small size touch control display apparatus such as intelligent mobile phone, tablet PC, etc., and those display apparatuses with touch control display function.

The detect device 1001 photographs an image displayed on a screen of the display apparatus to obtain a first image signal.

When a user watches an image displayed by the screen of the display apparatus with touch control display function, a better quality image can be watched if the brightness of the displayed image is uniform, but the normal watching would be affected if the brightness of the displayed image is non-uniform. The uniformity of the brightness displayed by the screen is determined by whether the displayed grey levels of the image are consistent or not, and the displayed grey level is determined by a voltage difference between an input voltage of a pixel electrode and a voltage of a common electrode. When the voltage difference between an input voltage of each pixel electrode and the voltage of the common electrode is identical, the twisted angle of the liquid crystal molecule and the transmittance of light is identical, so that the brightness displayed on the screen is identical, i.e. the brightness of the displayed image is uniform.

In order to determine whether the image displayed by the display apparatus 1002 is uniform, the image displayed by the display apparatus should be obtained as an object for determination and reference. In the present embodiment, the first image signal is obtained by the detect device 1001 through photographing the image signal displayed by the screen of the display apparatus 1002.

In another embodiment, in order to reduce the amount of operation, the detect device obtains the first image signal which is determined to be non-uniform displayed after the user makes a rough determination on the displayed image, so that the consumed resource of the detect device and the amount of operation can be reduced.

The driving circuit 10021 obtains the first image signal of the image displayed on the screen from the detect device 1001.

Specifically, the driving circuit 10021 obtains the grey level information of each region of the first image signal while obtaining the first image signal.

The driving circuit 10021 further compares the first image signal with an original second image signal which corresponds to the first image signal to obtain a compensation data of the first image signal.

After obtaining the first image signal, the display apparatus sends the first image signal to a driving controller of the display apparatus for processing so that the first image signal is compared to an original and normal second image signal corresponding to the first image signal to determine whether the first image signal is a normal signal.

Specifically, the driving circuit 10021 calculates a difference value between the grey level information of the first image signal and the grey level information of the second image signal by the driving controller, which comprises comparing the grey level information of each region of the first image signal with the grey level information of a corresponded region of the second image signal, and determining whether the grey level information of the first image signal is consistent with the grey level information of the second image signal, i.e. determining whether the difference value of each region is zero, so as to prevent from the resource consuming caused by misjudgment from viewing angles.

A shift of grey level information is caused by different twisted angle of the liquid crystal molecules resulted from the different voltage differences between the input voltages of the pixel electrodes and the voltages of the common electrode, and a direct cause of the different voltage differences between the input voltages of the pixel electrodes and the voltages of the common electrode is that a voltage shift existed in the voltage of the common electrode. The more the amount of shift is, the more a variation of the voltage difference between the input voltage of the pixel electrode and the voltage of the common electrode is, and the problem of non-uniformity is more serious. Therefore, when the grey level information of the first image signal is not consistent with the grey level information of the second image signal, the amount of shift in the voltage of the common electrode corresponding the first image signal is further determined, and the compensation data is determined in accordance with the amount of shift.

The storage circuit 10022 stores the compensation data.

Because, in general, each tiny electrode and other devices in the display apparatus would not vary after the display apparatus is manufactured, the compensation data is stored in the storage circuit 10022 for compensating the displayed first image signal in order to overcome the non-uniformity of the displayed image resulted from the amount of shift in the voltage of the common electrode of the array substrate due to the structure of the display apparatus during operating the display apparatus, so that the voltage difference between the voltage of the input signal of the pixel electrode and the voltage of the common electrode is identical while displaying any kind of first image signal to ensure the uniformity of the image displayed on the screen of the display apparatus.

Different from the conventional technique, the detect device of the display apparatus in the present embodiment obtains the first image signal from photographing the image displayed on the screen of the display apparatus, the driving circuit of the display apparatus obtains the first image signal of the image displayed on the screen of the display apparatus, compares the first image signal with the second image signal output from a signal source and corresponded to the first image signal, and determines the compensation data of the first image signal, and the storage circuit stores the compensation data, so that the image signal can be displayed by the display apparatus in accordance with the compensation data, and the voltage difference between the voltage of the input signal of each pixel electrode and the voltage of the common electrode is identical, so as to improve uniformity of the displayed image and watching experience of the users without decreasing the brightness of the displayed image.

Embodiments of the present invention have been described, but not intending to impose any unduly constraint to the appended claims. Any modification of equivalent structure or equivalent process made according to the disclosure and drawings of the present invention, or any application thereof, directly or indirectly, to other related fields of technique, is considered encompassed in the scope of protection defined by the claims of the present invention.

What is claimed is:

1. A method for improving uniformity of displayed image, comprising:
inputting a first image signal to a display apparatus;
compensating the first image signal in accordance with an image compensation data to obtain a third image signal, wherein the image compensation data is an amount of shift in a voltage of a common electrode of an array substrate of the display apparatus determined in accordance with a difference value between a grey level information of a first pixel and the grey level information of a second pixel next to the first pixel corresponding to the first image signal, wherein the grey level information is the difference between a pixel electrode and the common electrode; and
displaying the third image signal,
wherein the step of compensating the first image signal in accordance with the image compensation data to obtain the third image signal comprising: compensating the voltage of an input signal of the pixel electrode corresponding to the common electrode in accordance with the amount of shift in the voltage of the corresponded common electrode of the array substrate.

2. The method according to claim 1, wherein the display apparatus comprises a color-film substrate, the array substrate, and a liquid crystal layer disposed between the color-film substrate and the array substrate, a plurality of horizontally distributed touch control electrodes are disposed on one side of the color-film substrate backward the liquid crystal layer, a plurality of vertically distributed touch control electrodes are disposed on one side of the array substrate facing the liquid crystal layer, and the vertically distributed touch control electrodes and the common electrodes of the array substrate are integrated together to form a matrix formation on the array substrate.

3. The method according to claim 2, wherein the step of compensating the first image signal in accordance with the image compensation data to obtain the third image signal further comprising:

equalizing a plurality of voltage differences between the compensated voltages of the input signals of the pixel electrodes and the voltages of the corresponded common electrodes.

4. A display apparatus for improving uniformity of displayed image comprising a driving circuit, a compensation circuit and a display panel electrically coupled to each other, wherein
the driving circuit inputs a first image signal;
the compensation circuit compensates the first image signal in accordance with an image compensation data to obtain a third image signal; wherein the image compensation data is an amount of shift in a voltage of a common electrode of an array substrate of the display apparatus determined in accordance with a difference value between a grey level information of a first pixel and the grey level information of a second pixel next to the first pixel corresponding to the first image signal, wherein the level information is the difference between a pixel electrode and the common electrode; and
the display panel displays the third image signal,
wherein the compensation circuit compensates the voltage of an input signal of the pixel electrode corresponding to the common electrode in accordance with the amount of shift in the voltage of the corresponded common electrode of the array substrate.

5. The display apparatus according to claim 4, wherein the display panel comprises a color-film substrate, the array substrate, and a liquid crystal layer disposed between the color-film substrate and the array substrate, a plurality of horizontally distributed touch control electrodes are disposed on one side of the color-film substrate backward the liquid crystal layer, a plurality of vertically distributed touch control electrodes are disposed on one side of the array substrate facing the liquid crystal layer, and the vertically distributed touch control electrodes and the common electrodes of the array substrate are integrated together to form a matrix formation on the array substrate.

6. The display apparatus according to claim 5, wherein the compensation circuit equalizes a plurality of voltage differences between the compensated voltages of the input signals of the pixel electrodes and the voltages of the corresponded common electrodes.

* * * * *